June 2, 1970  R. M. WOODWARD ET AL  3,514,841
FORMING A TIP SECTION THAT FEEDS STREAMS
OF HEAT-SOFTENED MATERIAL
Filed May 17, 1967  4 Sheets-Sheet 1

ROBERT M. WOODWARD &
HELLMUT I. GLASER
INVENTORS

BY
Staelin & Overman
ATTORNEYS

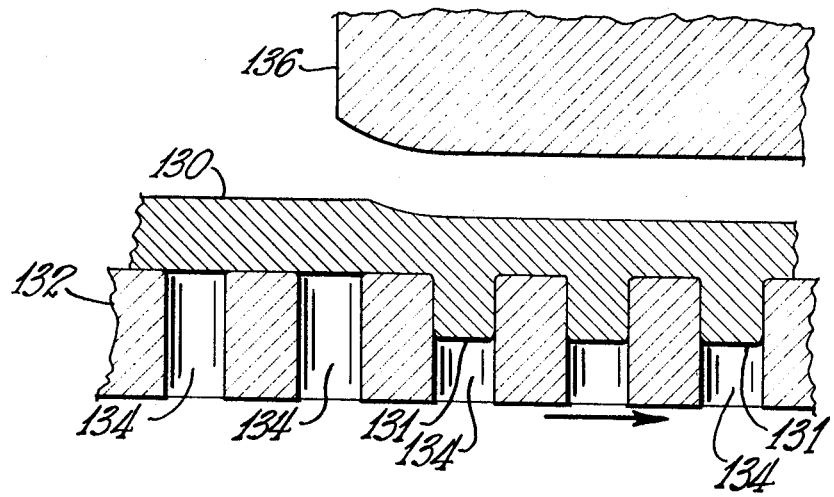
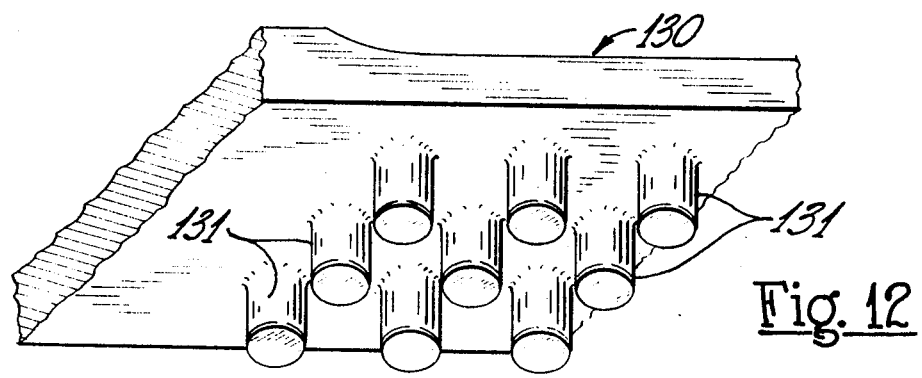
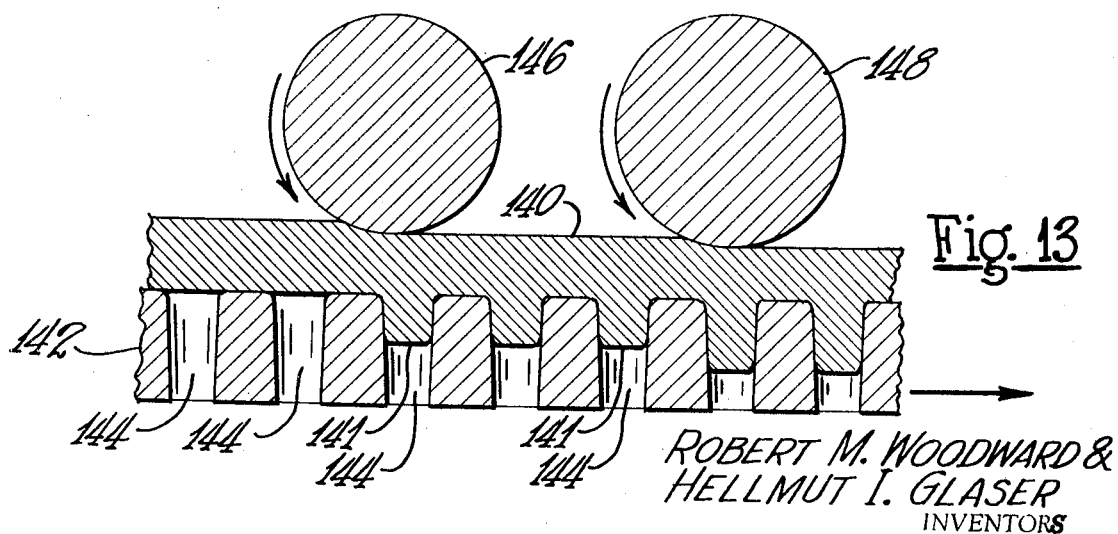

United States Patent Office 3,514,841
Patented June 2, 1970

3,514,841
FORMING A TIP SECTION THAT FEEDS STREAMS OF HEAT-SOFTENED MATERIAL
Robert M. Woodward and Hellmut I. Glaser, Newark, Ohio, assignors to Owens-Corning Fiberglas Corporation, a corporation of Delaware
Continuation-in-part of application Ser. No. 363,705, Apr. 30, 1964. This application May 17, 1967, Ser. No. 639,068
Int. Cl. C03b *37/02*
U.S. Cl. 29—480                                     8 Claims

ABSTRACT OF THE DISCLOSURE

A method for making a tip section for a stream feeder of flowable material by first forming a plate with raised portions on a major surface thereof, subsequently joining additional material on the end regions of the raised portions and drawing the material of the raised portions and added joined material into elongated tubular projections.

---

This invention relates to a feeder used to flow fine streams of heat softened mineral material such as glass of size and character adapted to be attenuated into fine continuous filaments; the invention relates more particularly to the method of forming the floor or bottom of the stream feeder or bushing and is a continuation-in-part of our application Ser. No. 363,705, filed Apr. 30, 1964, now abandoned.

In the formation of filaments particularly for textile uses, developments have been made facilitating the production of extremely fine continuous filaments wherein several hundred of such filaments are embodied in a single strand. Because each individual filament is attenuated from a single stream, the feeder floor must be provided with a plurality of orificed projections or tips delivering the number of streams equal to the number of filaments to be embodied in a strand. This necessitates providing orificed projections or tips in close proximity to each other, a condition which increases the difficulties of maintaining the continuity of flow of individual streams of uniform characteristics because of a tendency for the heat-softened glass of the streams to wet the exterior surfaces of the orificed projections causing "flooding" of the bushing, that is, the tendency for the glass to adhere to and migrate or creep along the surfaces of the projections and the lower surface of the floor of the feeder or bushing, a condition which interrupts or impairs stream flow necessitating shutdown and cleaning of the affected area of the feeder and restarting the attenuating operations.

An object of the present invention is a method of making a feeder capable of flowing a large number of streams from orificed tips or projections disposed in close relation in a manner whereby the tendency for the glass of the streams to wet the surfaces of the tips or projections is greatly reduced or substantially eliminated.

Another object of the invention is to make stream feeder or bushing having tips or projetcions formed with passages or orifices for flowing streams of glass or other heat-softened mineral material wherein the tips or projections are fashioned in whole or in part of an alloy having a high resistance to wetting by glass whereby to reduce the tendency toward flooding and promote continuity of stream flow.

Another object of the invention is to make an orificed tip construction for a stream feeder or bushing wherein the material providing the whole or part of the tip is alloyed with another metal and a particular range or amount to increase the wetting angle and thereby promote the delivery of streams of material of uniform characteristics and enhance the continuity and efficiency of attenuation of the streams to fine continuous filaments.

Another object of the invention resides in making a platinum and gold alloy stream feeder tip construction to minimize the wetting characteristics by heat-softened glass and facilitate the formation of comparatively small beads of glass during start-up of attenuating operations to reduce start-up time.

Another object of the invention resides in the provision of orificed tips for the tip section of a feeder or bushing for flowing streams of heat-softened glass fashioned of platinum alloyed with gold in proportions such that volatilization of the gold from the surface occurring by reason of the intense heat from the glass results in a migration of the gold in the alloy to the zones where concentrations of gold are low and the surface zones thus replenished with gold whereby to prolong the useful life of the tip structure while maintaining a high wetting angle and nonwetting characteristics of the tip surfaces.

Another object of the invention resides in the provision of a feeder having a tip section provided with a large number of orificed tips fashioned in whole or in part of an alloy or composition resistant to wetting by glass whereby the tips may be disposed or positioned in close relation with a minimum of liability of flooding.

Another object of the invention resides in a method of reducing wetting characteristics of a tip section of a glass stream feeder and promoting rapid and efficient start-up of filament attenuating operations involving the provision of material embodied in the orificed tips whereby softened glass tending to wet or adhere to the exterior surface areas of the tips may be readily stripped or pulled off or away from such surfaces by the operator during start-up operations whereby to facilitate start-up operations in a minimum of time.

Another object of the invention is a method of forging up from the surface of a plate of ductile material a plurality of closely spaced tubular projections by deforming the plate to move a quantity of the plate material into a plurality of closely spaced raised portions where each raised portion contains enough material alone for subsequent drawing into the tubular projections.

Another object of the invention is a method of forging up from the surface of a plate of ductile material a plurality of closely spaced tubular projections by deforming the plate to move into a plurality of closely spaced raised portions enough of the material of the plate to allow forming a part of each projection and building each portion up on its end with enough of the same or different material to complete each projection prior to drawing the raised portions into the tubular projections.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 11 is a sectional view showing a forging method for forming a plate of ductile material with raised portions on a surface thereof;

FIG. 12 is an isometric view showing a portion of a feeder floor plate made by the forging method of FIG. 11;

FIG. 13 is a sectional view showing a rolling method for forming a plate of ductile material wtih raised portions on a major surface thereof;

While the stream feeder construction made according to the method of the invention has particular utility for flowing fine streams of mineral material, such as glass, for attenuation to fine textile filaments, it is to be understood that stream feeders embodying orificed tips or projections of the invention may be utilized for flowing streams of material where a high resistance to wetting is desired.

Figure 1:
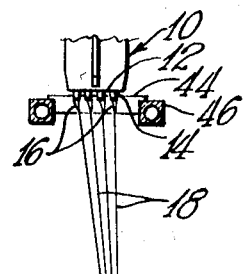
FIG. 1 is a semi-schematic elevational view of the stream feeder and filament collecting and packaging apparatus.

Referring initially to FIG. 1 of the drawings, there is illustrated a stream feeder or bushing 10 embodying the invention which is adapted to contain heat-softened or molten mineral material, such as glass, the floor or floor section 12 of the feeder being provided with orificed projections or tips 14 through which flow streams 16 of glass attenuated to filaments 18. The filaments are mechanically attenuated by winding a strand 20 of the filaments on a collector or tube 21 into a package 22. The filament attenuating and winding apparatus includes a housing 24 in which is journally supported a mandrel 26 driven by a motor (not shown) in a conventional manner.

The filaments 18 are converged into the strand 20 by a gathering shoe 28. A size or coating material may be applied to the filaments 18 by an applicator 30 which transfers the coating material contained in a receptacle 32 onto the filaments 18. During the winding of the strand 20 upon the collector 21, the strand is distributed lengthwise by means of a reciprocating bar 36 to form the package 22, the bar being equipped with an oscillator traverse member 38, the bar 36 and the traverse 38 being rotatable for oscillating the strand to effect a crossing of successive convolutions or wraps of strand on the collector to prevent the convolutions of strand from adhering together.

The winding apparatus or machine 24 is provided with conventional controls (not shown) governing rotation of the collet 26 and the strand distributing bar 36 and traverse oscillator 38 to effect collection of strand 20 into a package and to enable the removal of a completed package.

tions.

Figure 3:
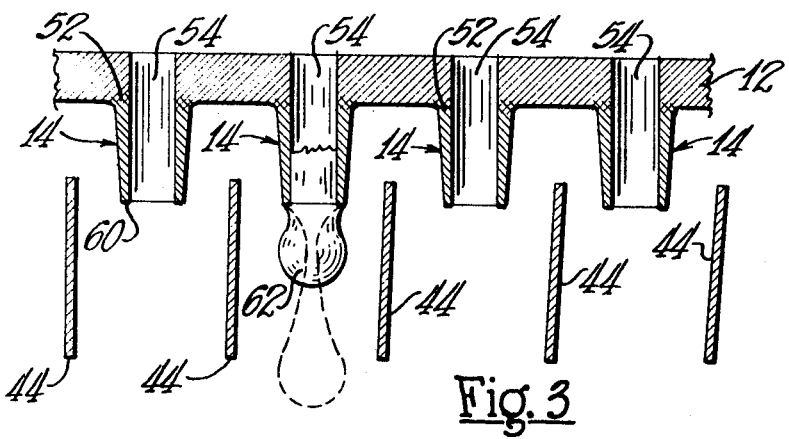
FIG. 3 is a greatly enlarged fragmentary sectional view illustrating a feeder floor section provided with orificed tip construction fashioned according to the invention.
Figure 2:
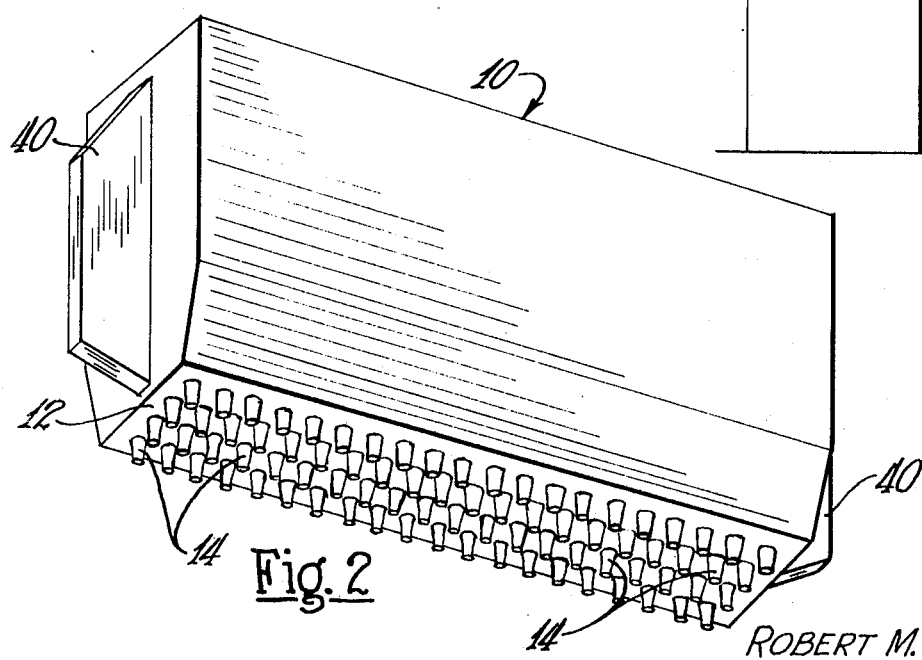
FIG. 2 is an isometric view illustrating a form of stream feeder particularly showing the orificed projections for flowing streams of material.

FIG. 2 and one form of orificed tip construction of the feeder is illustrated on an elongated scale in FIG. 3. The feeder or bushing 10, in the embodiment illustrated, is generally rectangular and the end walls thereof provided with terminals 40 to which current conductors (not shown) are connected for feeding electric energy of high amperage and low voltage through the feeder for maintaining the softened glass in the feeder at a desired temperature to facilitate delivery of streams of glass through the orificed tips 14.

As shown in FIG. 2, the orificed tips 14 are arranged in evenly spaced rows both lengthwise and transversely of the feeder and are disposed as close to one another as is practicable providing a large number of glass streams from a minimum floor area. It is found desirable to maintain the glass in the feeder at a comparatively high temperature and low viscosity to foster the delivery of streams of glass of uniform size through the orifices or passages in the tips. It is desirable to withdraw or absorb heat from the streams of glass in order to raise the viscosity of the glass of the streams to secure improved attenuation of the streams to filaments.

As shown in FIGS. 1 and 3, vanes or fins 44 are disposed transversely of the feeder and between each row of streams for absorbing heat from the glass streams. As shown in FIG. 1, the fins or vanes 44 are supported at each end by a manifold 46 preferably of tubular construction to accommodate flow of a coolant or heat-absorbing fluid to continuously convey away heat from the streams absorbed by the fins 44. The rate of absorption of heat by the vanes or fins is controlled in a measure by the temperature and rate of circulation of the cooling fluid. Any suitable heat-absorbing fluid may be employed but water is preferred because of its high heat absorption characteristics.

One form of feeder floor and tip construction of the invention is illustrated in FIG. 3. The feeder floor 12 is fabricated of a highly heat resistant material such as an alloy of platinum and rhodium which will withstand the high temperature of heat-softened glass. Heretofore it has been a practice in forming an orificed tip to fuse successive drops of platinum rnodium alloy on the feeder floor to build up a projection or tip which is then coined into the proper shape and drilled to provide a passage or orifice through which flows a stream of glass.

One of the difficulties encountered in the use of a platinum and rhodium alloy for tip constructions of a feeder for flowing streams of glass is that the wetting angle of this alloy is such that the glass tends to adhere to or wets the exterior surfaces of the tip. Wetting may take place to an extent that the glass from one stream joins an adjacent stream rendering further attenuation of the streams inoperative, necessitating a restarting operation of all of the filaments and streams.

It has been known that an alloy of platinum and gold wherein the gold content is from forty to seventy percent or more of the alloy is resistant to wetting and that such composition has been used in the fabrication of spinning jets for low temperature resinous filament-forming materials.

However, it has been found that platinum alloys having a high percentage of gold are wholly unsuitable for tips of a feeder section for flowing streams of glass because gold fuses at a much lower temperature than platinum and the strength characteristics of gold-rich platinum alloy are comparatively low.

It has been further found that by alloying a comparatively small percentage of gold with platinum or platinum alloy, that such alloy has a high wetting angle and a high resistance to wetting by glass. Such alloy containing a small percentage of gold has comparatively high strength characteristics and high resistance to abrasion under high temperatures rendering it suitable for the orificed tips or projections of a stream feeder for flowing streams of glass.

With particular reference to FIG. 3, each tip 14 is formed of an alloy of platinum and gold. The alloy may contain a small percentage of rhodium or other metal, such as iridium, to improve the strength characteristics of the platinum. It has been found that an alloy of this character containing gold in an amount between one percent and ten percent, a preferred range being between two percent and six percent, and preferably about three percent, has an increased resistance to wetting by glass, that is, the alloy has a comparatively high nonwetting angle of about seventy-three degrees. While the wetting angle varies wtih the character of the glass composition, it has been found that for most textile glasses, a wetting angle approximately seventy-three degrees is attained with the alloy.

Each of the tips or projections 14 may be formed by fusing successive crops of the alloy containing gold to the feeder floor 12, coining the fused material to the desired shape and drilling or forming an orifice or passage 54, the juncture of the gold bearing alloy with the feeder floor 12 being indicated at 52. It is to be understood that FIG. 3 illustrates the tip construction on a greatly enlarged scale and, in the actual construction the tips 14 are in close relation, a factor which tends to increase the liability of flooding. With the tips or projections 14 fashioned of gold and platinum alloy, the resistance to wetting and flooding is greatly increased. This characteristic enables fashioning the tips closer together than with other materials employed for tip construction.

The annular surface 60 of a tip 14 at the exit or outlet end is of comparatively small area and is a factor enhancing rapid start-up operations. It has been found that other factors and conditions affecting start-up time include the weight of the bead 62 of glass which forms at and is suspended from the tip upon filament break-out and the lapsed time of formation of a bead until it drops by gravity. It is found that reduction of shortening of the bead drop time reduces the handling time or downtime in effecting a restart of filament attenuation.

The weight of the bead formed at the tip and the duration of the period of its formation or the bead drop time, are dependent in a measure upon the dimensional characteristics of the annular terminal edge or surface from which the glass is delivered. Thus the area of the annular region or marginal edge 60 defining the exit or outlet of the passage or orifice 54 should be made as small as practicable, preferably of a wall thickness at the edge of five thousandths of an inch or less in order to minimize bead drop time and hence handling time in restarting filament attenuating operations.

By fashioning the annular surface 60 of a minimum area and fabricating the tip 14 of an alloy having a high resistance to wetting, the reduced tendency for the glass to wet the exterior surfaces of the tips reduces the liability for the glass of a bead from one tip joining the glass at an adjacent tip. Furthermore the reduction in the tendency of the material of the tip to become wetted by the glass fosters the formation of a glass bead 62 of minimum diameter, a further advantage attained by reason of the reduced tendency for the exterior surfaces of the tips to be wetted by the glass.

The employment of a platinum alloy containing a comparatively small percentage of gold additionally provides certain physical characteristics particularly advantageous in flowing glass streams from an orificed tip construction.

This is believed to be due to the apparent characteristic of the gold-platinum alloy to maintain homogeneity of the gold throughout the gold-platinum alloy. It is found in practical use of the gold-platinum alloy tip construction, that under high temperatures the rate of volatility of the gold is comparatively low so that the residual gold in the alloy continuously migrating toward the interface provides satisfactory anti-wetting characteristics that is, a high level wetting angle throughout the useful life of the tip construction.

The gold-platinum alloy or system of this character, by reason of the comparatively high nonwetting angle, greatly reduces the tendency toward wetting of the tip surfaces. Furthermore, while such alloy, even with a high nonwetting angle, may become wetted or partially wetted with glass, the operator, during the restarting operation, draws the filaments of the streams laterally of the tip section. By this operation, any softened glass adhering to the exterior surfaces of the tips is stripped therefrom to enhance a rapid restart of attenuating operations.

The tip construction therefor is selfcleaning in this respect, a function which renders this character of tip construction particularly useful for concomitantly flowing a large number of glass streams for attenuation to extremely fine filaments of a size usually below fourteen hundred thousandths of an inch in diameter.

While an alloy of platinum and gold and a small percentage of rhodium may be employed embodying a gold content between two percent and ten percent, it is found that the alloy containing three percent or less of gold is very satisfactory, such percentage of gold being well below the amount at which a secondary phase tends to form.

Figure 4:
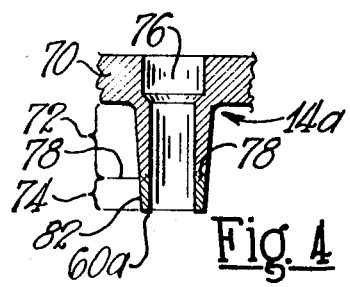
FIG. 4 is a greatly enlarged fragmentary view, partly in section, illustrating a modification of orificed tip for a stream feeder in which the tip is fashioned in part of a different alloy.

FIG. 4 illustrates a portion of a feeder floor or tip section in which a terminal portion of a tip or projection is fashioned or gold-platinum alloy of the composition hereinbefore described. The feeder floor or plate 70 is of the same character and composition of platinum and rhodium as the plate or floor 12 shown in FIG. 3. The portion 72 of the tip 14a may be built up by successive fusing or welding of drops of platinum-rhodium alloy to the plate 70, and the alloy comprising the portion 72 of the tip and that of the plate may be the same. In this form, the end region 74 of the tip 14a may be fashioned of gold-platinum alloy in the percentages herein described to provide a gold alloy exterior surface at the terminal of the tip in order to resist the tendency for the glass to wet the exterior surface of the tip. When the tip portion 72 has been fabricated to the region 78 by the method above described, the portion 74 may then be fashioned by fusing successive drops of gold-platinum alloy to the extremity of the portion 72 until the desired tip length is attained.

The gold-platinum alloy is fused to the platinum-rhodium alloy of the portion 72 of the tip 14a at the region indicated at 78. The annular edge or surface 60a of the tip is of a minimum area to reduce the bead formation and drop time as hereinbefore described. By providing a gold-bearing alloy surface 82 at the exterior terminal region of the tip 14a, the tendency of the glass to wet the surface is greatly reduced. This construction has been found to be satisfactory and requires a lesser amount of gold-platinum alloy for a tip than the construction shown in FIG. 3. After a tip is fashioned in the manner described, the counter-bored passage or orifice 76 is drilled or otherwise formed in the tip.

Figure 5:
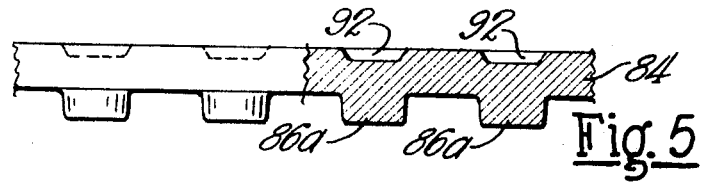
FIG. 5 is an enlarged fragmentary detailed view, partly in section, of a modified form of feeder floor section illustrating a step in a method of forming orificed projections.
Figure 6:
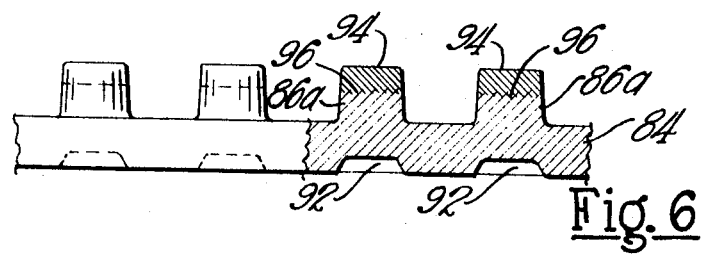
FIG. 6 is a view, partly in section, of a feeder floor illustrating a further step of fusing material to the raised projections.
Figure 7:
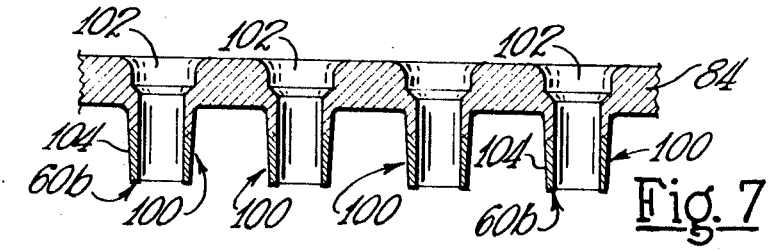
FIG. 7 illustrates a further step in the method of forming orificed projections in the arrangement illustrated in FIG. 6.

FIGS. 5 through 7 illustrate steps in a modified method of forming orificed tips or projections on a plate or tip section of a stream feeder for flowing glass streams. Referring initially to FIG. 5, a floor or plate section 84 for a feeder is fashioned with integral raised portions 86a. The raised portions are formed by indenting the plate as at 92 while compressing or coining the metal of the plate, preferably in a nonheated state, forcing the metal to the shape of the raised portions 86a.

FIG. 6 illustrates a further step in the method which comprises fusing or joining additional metal or alloy to the raised portions 86a to provide an amount of metal 94 and that of the raised portions 86a sufficient to form a tip by one or more drawing operations to form the orificed tip construction shown in FIG. 7. The plate 84 of the tip section may be fashioned of platinum or platinum-rhodium alloy. The material 94 may be of the same alloy as that of the plate 84, or as indicated in FIG. 6, may be of a different alloy such as an alloy of platinum and gold of the character hereinbefore described.

The added metal or alloy 94 is fused to the projections 86a at regions 96 by fusing successive drops of gold-platinum alloy one upon another until the desired height of projection is attained.

In this method of formation of orificed tips, the completed tips 100, shown in FIG. 7, are fashioned by drawing the projections, shown in FIG. 6, to the configuration shown in FIG. 7, forming the passage or orifice 102 through which the glass flows, the portion 104 of each tip being of the gold-platinum alloy 94 which had been previously fused to the projections 86a shown in FIG. 6. While the passage or orifice 102 is shown having a flared entrance such as a passage that is counter-bored after initial passage forming, a substantially cylindrical passage may be made similar to the passage or orifice 54 shown in FIG. 3.

The configuration of the tip shown in FIG. 7 is obtained by conventional drawing dies (not shown) brought into registration with the recesses 92 to force the metal of the tip construction downwardly and outwardly into a matrix (not shown) having recesses of reciprocal shape to that of the formed tips 100. While the construction of completed tip 100 may be formed by drawing the metal as above described, the depth of drawing may be in successive steps as is conventional in metal drawing operations and the drawing operations may be used in combination with other techniques such as counterboring.

Thus the terminal region 104 of each of the tips 100 may be fashioned of gold-platinum alloy and hence endowed with the nonwetting or wetting resistant characteristics provided by the gold constituent in the alloy. The annular edge 60b at the outlet of each passage 102 is of comparatively small area to reduce the bead formation and drop time as descirbed in connection with the tip construction shown in FIG. 3. The method shown in FIGS. 5 through 7 enables the fabrication of a tip section for a feeder wherein the metal of the plate or feeder floor and the added metal is reshaped to form the tip and the orifice or passage 102 in the tip through the drawing operations.

Figure 8:
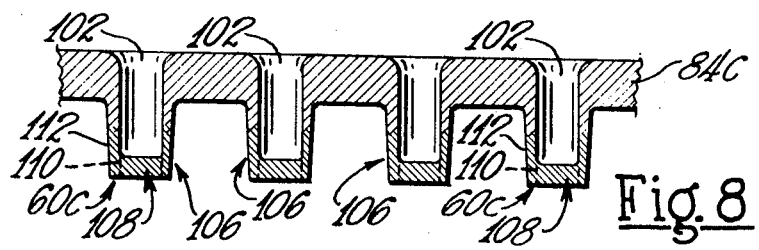
FIG. 8 is a fragmentary sectional view illustrating a modified method of forming orificed projections.

The tip construction shown in FIG. 8 is fashioned through the utilization of certain of the method steps employed in the formation of the tip construction shown in FIG. 7.

The plate 84c and the raised portions thereon including the added metal or alloy fused to the raised portions are processed through the method steps to form the successive configurations shown in FIGS. 5 and 6. In the formation of the tip 106 to its final shape, the passage 102, which is not counter-bored in this case, formed during the drawing operations does not extend entirely through the metal of the tip but forms a partial passage whereby a portion or web 108 remains at the terminus of the tip. In order to obtain an accurate sizing of the exit or outlet of the passage or orifice 102, the metal portion or web 108 of each tip may be drilled as shown in broken lines 110 to complete the passage through each tip. Through this additional step in FIG. 8, the exit of the passage is fashioned by drilling.

The annular edge or surface 60c is of comparatively small area for purposes hereinbefore explained. Where the tip portion 112 of each tip 106 is fashioned of gold-platinum alloy of the character hereinbefore described, the exterior terminal surfaces of the tips are endowed with nonwetting characteristics, and the same advantages are derived from the tip construction shown in FIG. 8 as are attained by the other tip constructions shown herein which embody gold-platinum alloy.

In the method step illustrated in FIG. 8, wherein the drawing operation is interrupted short of completing a through passage in the projection, the passage may be completed by removing the web portion 108 by machining or grinding. The ends of all of the tips should be machined or ground at one time to assure that the outlet surfaces are in a common plane whereby all of the tips are of equal length to promote the establishment of uniform heat patterns in all the tips to facilitate the formation of streams of uniform size and characteristics.

Figure 9:
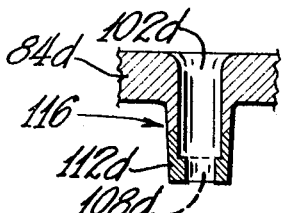
FIG. 9 is a sectional view of a tip construction illustrating a method of sizing the orifice.

FIG. 9 illustrates a tip construction 116 similar to that illustrated in FIG. 8. The tip construction illustrated is fashioned of metal reshaped from the plate 84d having a terminal region 112d of the tip preferably fashioned of gold-platinum alloy in the form of a built up construction hereinbefore described in connection with the method steps of FIGS. 5 and 6. The passage or well 102d is formed concomitantly by the drawing operation or operations in forming the tip configuration illustrated in FIG. 9 with the web portion 108d (shown in broken lines) remaining at the lower end of the tip structure. In this form, the web portion may be drilled to accurately size the outlet or orifice for flowing a glass stream. This arrangement accommodates the drilling of any diameter of outlet or orifice up to the diameter of the drawn passage 102d.

Figure 10:
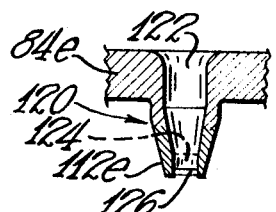
FIG. 10 is a sectional view of a tip construction illustrating a modified shape of tip and method of sizing the orifice.

FIG. 10 illustrates another modification of tip configuration. The tip 120, shown in FIG. 10, is fashioned through the utilization of the method steps illustrated in FIGS. 5 and 6 wherein the plate 84d provides material for the raised portions, and wherein the portion 112e is built up on the raised portions by fusing drops of platinum or platinum and gold alloy to raised portions in the manner illustrated in FIG. 6.

The tip construction is shaped by drawing operations to form a well or passage 122 extending partially through the tip construction, a web 124, shown in broken lines, remaining at the terminal of the tip construction. The portion 112e of each of the tip constructions, which is preferably gold-platinum alloy, may be configurated to a frusto-conical shape as illustrated with the wall regions of a thickness to establish a stabilized heat pattern in the tips. The web 124 may be drilled in a final step in the method to the size of outlet or orifice desired.

Another method step may be utilized in forming the orifice or outlet in the tip construction shown in FIG. 10. The web 124 of the tip may be comparatively thin and, after fabrication of all of the tips on a tip section, the material of the web 124 may be removed by grinding or otherwise removing the material of the web along the line indicated at 126 to provide a through passage or orifice in the tip. Through this method all of the tips will be the same length and the outlets or orifices of the same size.

FIGS. 11 through 17 illustrate additional method steps for forming raised portions, similar to the raised portions 86a shown in FIGS. 5 and 6, suitable for subsequent processing into finished orificed tips or projections on a feeder floor or tip section of a stream feeder for flowable material, especially molten glass. While the method steps of FIGS. 11 through 17 provide raised portions on the end regions of which additional metal or alloy such as an alloy of platinum and gold of the character hereinbefore described may be fused or joined, the steps may be appropriately applied to increase the amount of alloy in the raised portions, viz through increased height of the raised portions to provide material enough within the raised portions themselves to fashion completed or finished orificed tips or tubular projections such as shown in FIG. 7 by metal drawing the raised portions as herein discussed.

A useful method for forming raised portions or projections of desired height, i.e. each projection containing a desired amount of ductile metal or alloy, includes beginning with a plate that is thicker than is required or desired for the finished tip section or feeder floor and suitably compressing the plate between two surfaces where one is a die surface having a plurality of spaced apart openings or recesses. As the material of the plate is worked under compression, some of the material flows into the openings or recesses in the die surface and the thickness of the plate is reduced. The material that is flowed into the openings or recesses forms a plurality of solid raised portions or projections integral with and made from the metal or alloy of the plate. Of course, the amount of material flowed into the openings, accomplished either while the plate is in a heated or non-heated state, is controllable. If a finished orificed projection drawn wholly from the available material of the plate and its raised portions is desired, enough material may be flowed into the openings or recesses of the die surface to provide enough material to support the formation of the projections. If wanted, additional material in the form of an alloy or metal can be added to the end region of the raised portions and a finished orificed projection subsequently drawn by conventional metal drawing techniques.

One method for working a plate to reduce its thickness and concomitantly selectively flowing a quantity of its material to form raised portions is shown in FIG. 11. A plate 130 of suitable ductile material, e.g. an alloy containing platinum, that is thicker than desired for the finished tip section is placed on the working surface of a dieplate or anvil 132 having a plurality of predetermined spaced apart passageways 134 opening thereon. A forging hammer 136 is located over the plate 130. The hammer 136 works the material of the plate 130 under the compressive forces of conventional forging methods by moving the hammer 136 to strike a series of blows against the plate 130 or otherwise suitably pressing the plate 130 while it is in a heated or nonheated state. As the material of the plate 130 is worked under the hammer 136, some of the material of the plate flows into the die passageways 134 as raised portions or projections 131 while the thickness of the rest of the plate 130 is being reduced.

FIG. 12 shows the plate 130 formed into a partially completed feeder floor or tip section having rows of the raised portions 131. FIGS. 11 and 12 clearly illustrate the reduced thickness of the plate 130 in the zone of the plate 130 that has been compressed to form the projections 131 and the greater thickness dimension of the plate 130 in the area where it has not been worked on.

The height of the raised portions 131 may be controllably varied. The more the plate 130 is reduced in thickness the greater is the amount of material that flows into the die passageways 134. In this regard portions 131 of desired height, i.e. containing a desired quantity of alloy, may be obtained with a selected finished tip section (plate) thickness by employing a plate of predetermined thickness and working the plate to the selected reduced or finished plate thickness as the raised portions are formed.

While the method of making the plate 130 having raised portions 131 may be accomplished by compressively working successive zones of the plate 130 as by moving the plate 132 in the direction of the arrow indicated in FIG. 11, the entire plate 130 may be compressively worked at one time to provide a plurality of raised portions in one step.

Referring to FIG. 13, a rolling technique may be employed to reduce the thickness of a plate and flow a quantity of the plate material into the openings of a dieplate. Referring to FIG. 13, a plate 140 of selected thickness is placed on the working surface of a dieplate 142 having a plurality of spaced apart die passageways 144 opening onto the working surface thereof. A pair of associated cylindrical rollers 146 and 148 or the like located above the die 142 are moved to roll across the surface of the plate 140 with compressive force. The material of the plate 140, e.g. an alloy containing platinum, is worked to a point where a quantity of it flows into the passageways 144 in the form of raised portions 141; the thickness of the rest of the plate 140 that has been worked is reduced. The rollers 146 and 148 are disposed to successively reduce the thickness of the plate 140 and may be moved to make a series of passes across the surface of the plate 140 in reducing its thickness. Moreover, more than two rollers may be employed. Further, it may be advantageous at times, as illustrated in FIG. 13, to employ a tapering passageway 144 fashioned with tapering walls extending from a larger cross sectional area at its entrance at the surface of the dieplate 142 where the alloy or metal is introduced and extending in reducing cross sectional area.

Figure 14:
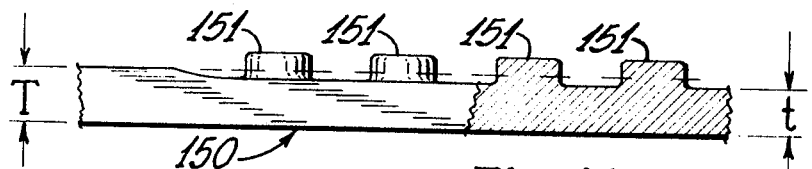
FIG. 14 is a view, partly in section, showing a plate of ductile material worked by a forging method to have raised portions on a major surface.

FIG. 14 illustrates a portion of a tip section made from a plate 150 having raised portions 151 formed by flowing a quantity of plate material into die passageways or recesses as the thickness of the plate 150 is reduced. Here the hammer (not shown) also functions as the dieplate. This may be accomplished by employing a hammer similar to that shown in FIG. 11 but having the surface contacting the plate 150 fashioned with suitably spaced apart recesses or passageways opening thereon. The plate 150 can be placed on any appropriate supporting means having a smooth surface. As the plate is indexed relative to the hammer and compressively worked, a quantity of plate material flows into the passageways of the hammer in the form of raised portions 151. The thickness of the plate is reduced from a larger thickness T to a reduced thickness t in the zone that has been worked.

While the tip section fabricated by the method shown and described herein can have raised portions which in themsleves provide enough metal or alloy to make finished orificed tips or projections by metal drawing techniques, if desired, additional material may be joined, as by fusing, onto the end regions of the raised portions to draw finished orificed tips comprising the same or different material. While an alloy of platinum and gold of a character hereinbefore described may be added to the end regions of the raised portions with excellent high resistance to wetting ensuing with orificed or tubular projections subsequently formed therefrom, several other alloys containing platinum have utility as material added to the end regions of the raised portions as discussed herein. One such alloy is a three component platinum alloy having the principal ingredients consisting of platinum, iridium and rhodium. The proportions of the ingredients comprise 85% platinum, 10% rhodium and 5% iridium. Further, an alloy comprising at least from 85% to 95% platinum and 5% to 15% iridium is a useful material for forming a tip section.

Figure 15:
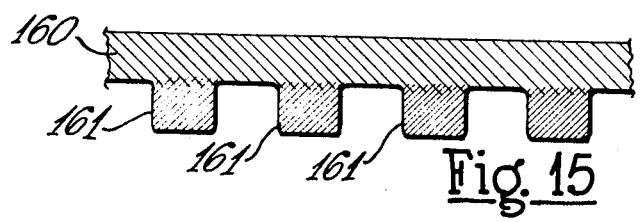
FIG. 15 is a sectional view of a plate with raised portions joined on a major surface.

Raised portions may be provided by suitably adding alloy or metal to a plate where the alloy or metal is different therefrom. Referring to FIG. 15, successive drops of the desired material may be selectively added to a plate 160 until enough of the material has been accumulated to provide a plurality of raised portions 161. After the build-up of the projections 161, they may be coined into the proper shape prior to drawing the finished orificed tips. Moreover, short pieces of wire having a requisite diameter may be suitably joined, e.g. by resistance welding, to the plate 160 to extend away therefrom as raised portions 161. These raised portions of wire may also be coined for proper shape prior to metal drawing into a finished orificed tip. Also, the wires may be cut sufficiently short for joining an alloy or metal of suitable character to the end regions thereof to provide raised portions comprising a wire portion and an added joined portion of the same or different alloy or metal. Subsequent drawing may be accomplished to fashion a finished orificed tip.

Figure 16:
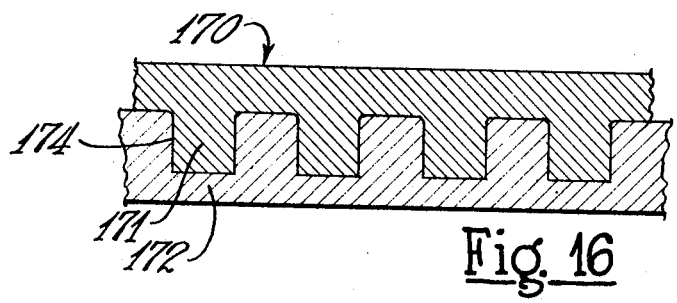
FIG. 16 is a sectional view showing a casting method for forming a plate with raised portions on a major surface thereof.

A casting technique may be employed to fabricate a plate of desired thickness and having raised portions suitable for subsequent drawing into finished orificed tips or projections. As shown in FIG. 16, a plate 170 is cast in a suitable mold 172 having recessed portion 174 that provide the plate 170 with raised portions 171. Because of the high temperature required to melt platinum alloys and maintain them for casting, it is difficult to find suitable material for the molds and it may therefore be advantageous to employ special casting techniques such as the "lost wax" method. The raised portions 171 may be cast to have any desired height. Further, as discussed herein, additional material may be fused or joined to the end regions of the raised portions 171 prior to drawing the finished orificed tips.

Figure 17:
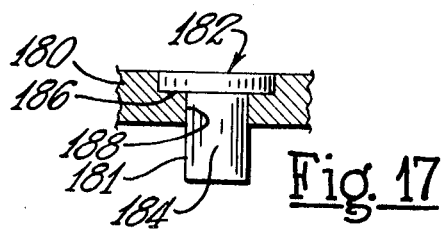
FIG. 17 is a sectional view of a plate with an insert extending on a surface as a raised portion.

FIG. 17 shows yet another method for providing raised portions that may be subsequently drawn into finished orified tips or tubular projections. A blank 182 having a cylindrical portion 184 and a flange portion 186 is dropped into a mating countersunk passageway 188 extending through the plate 180. The blank 182 may be appropriately ressitance welded or the like to the plate 180 with a length of the cylindrical portion 184 extending above one of the plate's major surfaces as a raised portion 181.

The plate portion or floor of the tip section for the feeder in the several forms of tip section illustrated is preferably formed of an alloy of platinum and rhodium wherein the rhodium constituent may be five percent to fifty percent of the alloy in order to obtain high strength characteristics for resisting the high temperatures of the molten glass, although other alloys having different percentages of rhodium or other materials alloyed with platinum may be used where the characteristics of such alloys are suitable for use in flowing streams of heat-softened mineral material such as glass.

It is apparent that, within the scope of the invention, modifications and different arrangements may be made other than as herein disclosed, and the present disclosure is illustrative merely, the invention comprehending all variations thereof.

We claim:

1. The method of forming a tip section of a feeder for flowing fine streams of flowable material comprising the steps of:
    forming ductile metal into a body of substantially greater width and length and thickness and having a plurality of solid raised portions of the same metal as the body on a major surface thereof;
    joining a quantity of ductile metal to each of the raised portions to further increase the height of each of the raised portions; and
    mechanically displacing the ductile metal under pressure to shape passageways by the use of dies through the combination of the body, the solid raised portions and the joined metal to form tubular projections.

2. The method of forming a tip section of a feeder for flowing fine streams of flowable material as recited in claim 1 wherein the metal joined to each of the raised portions is different than that of the body.

3. The method of forming a tip section of a feeder for flowing fine streams of heat-softened glass comprising the steps of:
    shaping a plate of ductile metal under compressive forces to reduce the thickness of the plate and concomitantly moving metal of the plate to form solid raised portions on a major surface thereof;
    fusing additional ductile metal to each of the raised portions thereby increasing the height of each of the raised portions; and
    mechanically displacing the ductile metal under pressure to form passageway by the use of dies through the combination of the plate, the raised portions and the fused metal to form tubular projections for passage of heat-softened glass therethrough.

4. The method of forming a tip section of a feeder for flowing fine streams of heat-softened glass as recited in claim 3 including fusing a high temperature resistant alloy different from the alloy of the plate to each of the raised portions to further increase the height of the raised portions.

5. The method of forming a tip section of a feeder for flowing fine streams of heat-softened glass as recited in claim 3 including joining additional ductile metal to each of the raised portions to further increase its height.

6. The method of forming a tip section of a feeder for flowing fine streams of heat-softened glass as recited in claim 3 wherein the additional ductile metal is an alloy containing gold.

7. The method of forming a tip section of a feeder for flowing fine streams of heat-softened glass as recited in claim 6 including drawing the alloy of the plate, the alloy of the raised portions and the fused alloy containing gold into tubular projections wherein the alloy containing gold is located at the end region of each of the tubular projections.

8. The method of forming a tip section of a feeder for flowing fine streams of flowable material as recited in claim 1 wherein the metal joined to each of the raised portions is the same as that of the body.

References Cited

UNITED STATES PATENTS

| 2,973,283 | 2/1961 | Hill | 65—374 X |
| 3,141,358 | 7/1964 | Burke et al. | |
| 3,248,190 | 4/1966 | Woodward et al. | 65—1 |

FOREIGN PATENTS

| 763,160 | 12/1956 | Great Britain. |
| 1,049,517 | 11/1966 | Great Britain. |

S. LEON BASHORE, Primary Examiner

R. LINDSAY, JR., Assistant Examiner

U.S. Cl. X.R.

29—481; 65—1, 274; 76—107